United States Patent Office 2,881,680
Patented Apr. 14, 1959

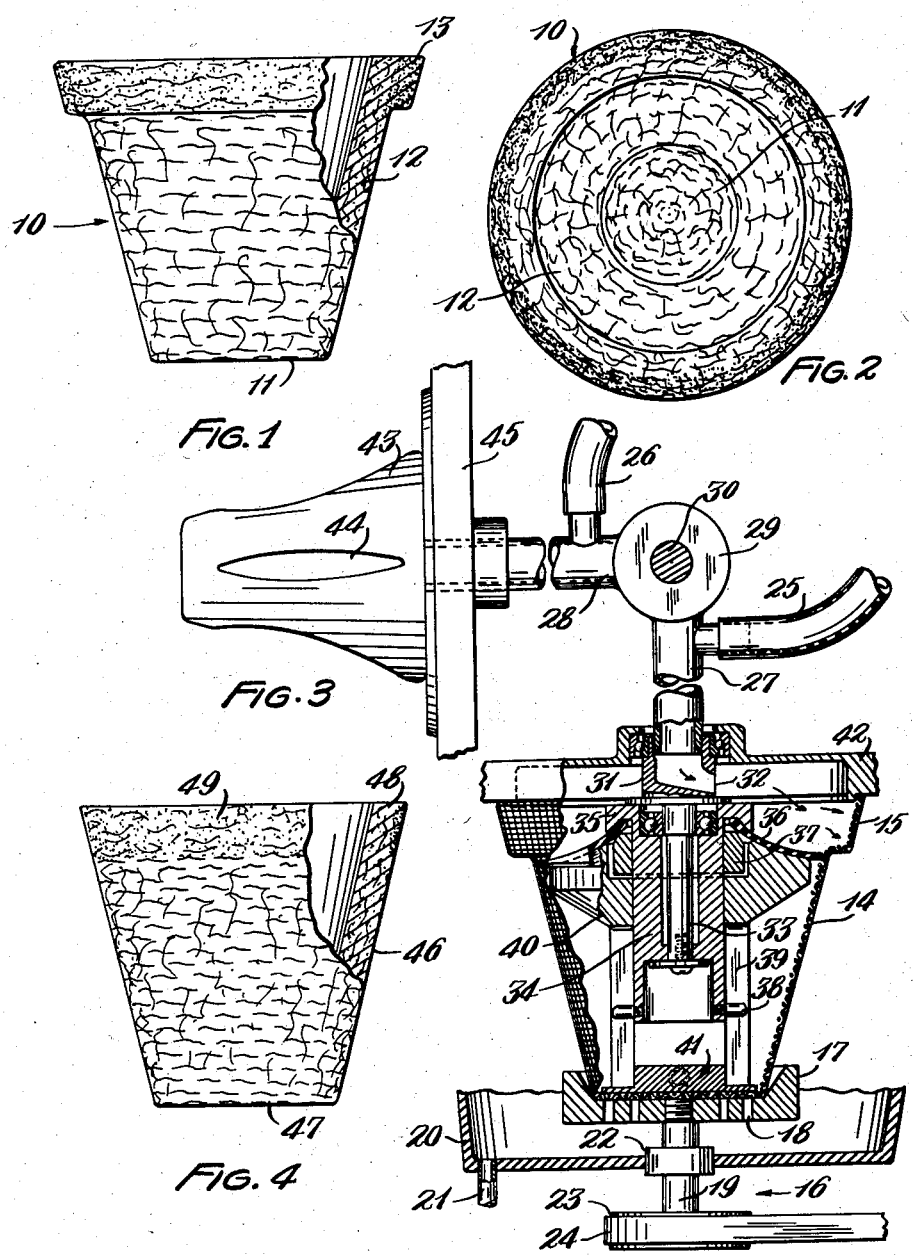

2,881,680

METHOD OF MAKING PLANT POTS

Ralph A. Spengler, Cleveland Heights, Ohio, and Alfred O. Reynolds, Indianapolis, and Charles W. Snyder, Lebanon, Ind.; said Reynolds and said Snyder assignors to said Spengler Original application December 5, 1952, Serial No. 324,384, now Patent No. 2,728,169, dated December 27, 1955. Divided and this application August 10, 1955, Serial No. 527,572

7 Claims. (Cl. 92—58)

This invention relates to a method for the making of pots used in growing and/or transplanting plants and, more particularly, relates to a method for making pots of the type and kind which are shown and described in my copending application, Serial No. 324,384 filed Dec. 5, 1952, and now Patent 2,728,169 granted Dec. 27, 1955. This application is a division of my copending application above identified.

It has heretofore been proposed to form plant pots of organic material and various materials and modes of constructing such pots have been proposed, but the results have not been entirely satisfactory.

An object of this invention, therefore, is to provide an improved method of making plant pots wherein the pot is formed substantially of organic fibers in such a manner that it is sufficiently sturdy to withstand normal commercial handling and shipping.

Another object of the invention provides a method of making an improved plant pot such that the pot has an integral bottom and side wall of intermeshed organic fibers thereby increasing the strength of the pot while preserving high porosity, high moisture retention and freedom for root penetration, the rim of the pot being additionally reenforced to prevent breakage when grasped by the user.

A further object of the invention is to provide an improved method of making plant pots whereby the pot has an integral bottom and side walls spun from intermingled organic fibers in a manner such that the fibers interlock and tend to extend generally circularly relative to the vertical center line of the pot, the pot also having an integral reenforcing band adjacent the rim thereof to prevent crumbling or breakage thereof during handling.

A still further object of the invention is to provide a method of making plant pots wherein the pot is formed of interlocking peat moss fibers, and provided with a reenforcing band of other cellulose fibers in the region of the rim of the pot with adjacent fibers of the side wall and band united by interengagement so that the band is integral with the pot.

A further object of the invention is to provide a method of making plant pots whereby the bottom and side wall of the pot are integrally formed of peat moss fibers spun from a liquid suspension thereof in a manner such that the principal fibers interlock and tend to extend generally circumferentially of the pot, the outer surface of the rim portion of the pot being provided with a reenforcing band of other spun cellulose fibers interlocked wth the fibers in the side wall of the pot.

Other and further objects of the invention will be apparent to those skilled in the art to which it pertains from the following description of the present preferred embodiment, and certain modifications thereof, described with reference to the accompanying drawing in which:

Fig. 1 is a view principally in side elevation but with a portion broken away to show a section of a plant pot which is made in accordance with the method described herein;

Fig. 2 is a top plan view of the pot shown in Fig. 1 and further illustrating, to a somewhat exaggerated degree, the orientation of the fibers therein;

Fig. 3 is a schematic illustration of apparatus which may be utilized in practicing the method of manufacturing pots, examples of such pots being shown in Figs. 1 and 2, the said view being partly in side elevation and partly in vertical section; and Fig. 4 is a view similar to Fig. 1 but showing a modified form of transplanting pot which may be made by the method disclosed in the present invention.

In accordance with this invention, the novel plant pots are formed by a circular spinning operation effected upon a liquid suspension or slurry of organic fibers as it is introduced into a perforate mold so that the said fibers are interengaged or intermeshed with the bottom of the pot being integral with the side wall thereof and with the longer fibers tending to be oriented to extend generally circularly relative to the vertical center line of the pot. The liquid suspension or slurry is preferably formed principally from peat moss which has been subjected to the action of a wet attrition mill or beater in the presence of water so that the fibers are thoroughly separated and suspended in the water. The consistency of the slurry or suspension, when introduced into the mold, is preferably in the order of 98% water and 2% solids, although it will be apparent that this ratio is not critical. A plant pot formed in this manner, the details of which will be hereinafter more fully described, preferably has the excess water removed therefrom, while the pot is still in the mold, and the pot is further dried subsequent to removal from the mold by any suitable means.

The completed pot may be employed in the same manner that a clay pot is utilized for the reception of seed or of a transplanted plant and the plant may be watered while thus contained without the need of special care or attention to the pot. This is due to the fact that the pot does not disintegrate simply under the presence of moisture since the fibers were thoroughly interengaged or intermeshed by the spinning operation. Nevertheless, the pot is porous and freely permits the penetration of plant roots therethrough so that the pot may be placed in the ground without removal of the plant therefrom. When this is done, the roots of the plant continue to grow through the pot without appreciable constriction or hindrance while the pot gradually disintegrates and adds its substance to the soil. Plant growth may be stimulated both before and for a time after the pot is placed in the ground by the addition of various ingredients such as fertilizers, insecticides, or the like, to the body of the pot. This may be effected: by mixing such additives with the organic fibers, such as the peat moss fibers, either during or subsequent to the milling or beating operation; by dipping the completed pots in a solution or solutions of such additives; by spraying the pots with such solutions; or by employing other known procedures.

Plant pots composed of fibers, such as peat moss or combinations thereof with other fibers, and formed by the aforementioned spinning operation, are materially stronger than pots prepared by pressing, molding, or similar operations since the spinning causes the fibers to intermesh or interlock rather than simply layering or stratifying as occurs when the pots are formed by pressing or the like. Consequently, the spun fiber pots can better withstand ordinary commercial handling. It has, however, been found that any plant pot is subjected to greater stresses in the rim portion thereof than in the other parts since the workers engaged in transplanting plants to pots or otherwise handling plant pots on a commercial scale work with considerable speed and customarily grasp the pots adjacent the rim in a manner such that forces are exerted which tend to crush or crumble a portion of the rim. This mode of handling the pots results in considerable breakage and other damage of conventional organic pots especially when the pots are moist when handled. One way of overcoming this defect is to provide a thickened portion of the pot adjacent the rim which may be readily effected by providing a suitably shaped mold. However, in accordance with this invention, still greater strength is achieved at this critical location by providing the pots with a reenforcing band about the upper outer surface thereof which band is preferably formed of a higher strength fibrous material integrally united with the fibers of the side wall of the pot.

Referring now to Figs. 1 and 2 of the drawing, the plant pot 10 shown therein is made in accordance with the method as disclosed herein so that it has a bottom 11 and integral side wall 12 formed of organic fibers, preferably peat moss, which are intermeshed or interlocked with the longer fibers having a general tendency to be disposed circumferentially, that is, circularly, relative to the vertical center line of the pot, as is illustrated to an exaggerated degree in Fig. 2. The upper portion of the side wall 12, adjacent the rim, is thickened or enlarged and is provided with a reenforcing band 13 of fibers which are supplied during the initial formation of the pot in a manner such that they are subjected to rotary motion so that they intermesh with each other and with the adjacent fibers of the side wall 12 thereby providing one unitary structure.

The fibers forming the reenforcing band 13 may be either organic or inorganic, but preferably are such that, when disposed as just mentioned, they provide a greater strength per unit dimension than do the adjacent organic fibers in the main body of the pot. As an example of fibers suitable for this purpose, but without limitation thereto, may be mentioned various cellulose materials of which kraft or newsprint pulps, and especially the former, have been found particularly advantageous. It is not, however, necessary that the fibers in the band 13 be capable of decaying or disintegrating since, being disposed adjacent the top edge of the pot, they will not interfere with the root growth. In fact there are instances where it would be desirable that these fibers not disintegrate, since the pot might then be planted in the ground with the rim portion extending slightly thereabove, thus providing a protective circle of material about the stalk of the plant preventing cut-worms and the like from securing access thereto.

The fibers in the main body of the pot should be principally organic although some non-organic fibers may be employed if mingled with the organic fibers. Peat moss fibers or mixtures thereof with minor quantities of other cellulose fibers, are presently preferred for the main body of the pot.

A plant pot of the type disclosed in Figs. 1 and 2 may be formed by employing apparatus of various types but for the purposes of this disclosure it is sufficient to note that the method may be performed by an apparatus of the nature schematically illustrated in Fig. 3. This apparatus comprises a perforate mold 14, which may be formed of wire mesh or thin sheet metal having suitable spaced openings therethrough and shaped to provide a circular bottom and tapered side walls, the upper portion of the mold being offset, as indicated at 15, to provide the thickened band or rim of the completed pot. The perforate mold 14 is removably supported upon a rotating means, generally designated 16, which is shown as comprising a rotatable plate or driving member 17 having suitable drain openings 18 and attached to a shaft 19 for rotation therewith. The supporting and driving member 17 is preferably positioned within a housing 20 having a drain 21 and also provided with a bearing 22 for the shaft 19, only a portion of the housing being here illustrated. Beyond the bearing 22, exteriorly of the housing 20, the shaft 19 is provided with a means for imparting rotation thereto, which means is here shown as a pulley 23 having a drive belt 24 trained thereabout and driven by a source of power, not shown.

It will be evident from the apparatus thus far described that, when the mold 14 is placed upon the supporting member 17 and the latter is rotated by the pulley and belt 23, 24, the mold will be correspondingly rotated. If desired, one or more complementary projections and recesses may be provided upon the mold 14 and member 17 to facilitate the transmission of rotary motion to the mold. In place of the plurality of small openings, the member 17 may simply have a single large opening in which the lower portion of the mold 14 is received.

The material for forming the rim and body of the pot are sequentially supplied under pressure through separate flexible conduits or hoses 25 and 26 communicating, respectively, with tubular members 27 and 28. The members 27 and 28 extend radially from an annular member 29 which is supported upon a shaft 30 for rocking about a horizontal axis in a manner such that either the member 27 or the member 28 may be rocked to a position coaxial with the mold 14. The shaft 30, and hence the parts supported thereon, may be raised and lowered by means not shown.

The outer end of the member 27 is provided with a nozzle member 31 having a lateral opening or openings 32 for discharge of the liquid suspension or slurry supplied through the conduit or hose 25. The nozzle member 31 has a shaft-like depending portion 33 on which a shield supporting member 34 is rotatably mounted. The member 34 has a flange portion 35, adjacent its upper end, which is undercut to receive the inner edge of a frusto-conical resilient shield member 36, the latter being held in place by a ring 37 which is mounted on the member 34 and has a beveled surface engaging the underside of the shield member 36. The member 34 is provided, adjacent its lower end, with radially extending pins or screws 38 which are received in longitudinally extending slots 39 of a shield operating member 40 that is axially slidable on the member 34 and is rotatable therewith. The lower end of the member 40 is provided with a foot portion 41 which is adapted to engage the bottom of the mold 14 when the assembly is lowered into the mold thereby moving the member 40 upwardly to the position shown in Fig. 3 so that the outer edge of the shield member 36 is deflected into engagement with the mold 14 adjacent the lower edge of the offset portion 15. It will be apparent, therefore that the slurry or liquid suspension supplied through the conduit 25 issues from the opening or openings 32 and is deposited as a band or rim of intermeshed fibers in the offset portion 15 of the mold. This material is prevented from being thrown from the top of the mold by a cover member 42 which preferably contacts the top of the mold and is rotatably supported on the nozzle member 31. If desired, the nozzle member 31 may be provided with scraping means to engage the inner surface of the pot rim as it is formed.

The tubular member 28 is provided on its outer end with an elongated nozzle member 43 having one or more axially elongated radial openings 44 communicating with the conduit 26 through the member 28. The member 43 is adapted to be inserted in the mold 14 by raising the shaft 30 to remove the nozzle member 31 and its shield assembly from the mold and then rocking the apparatus about the shaft 30 through an angle of substantially 90 degrees so that the nozzle member 43 is disposed vertically downwardly after which the shaft 30 is lowered to dispose the nozzle member 43 within the mold. When the nozzle member 43 is thus positioned within the mold 14 the material supplied through conduit 26 issues from the openings 44, while the mold is rotated, and is deposited on the bottom and side wall of the mold as a layer of intermeshed fibers a portion of which extend upwardly over the inner surface of the fibers previously deposited in the offset portion 15 and intermesh therewith. If desired, the nozzle member 43 may be provided with scraping means to engage the inner surface of the pot and assist in shaping the latter as it is formed. A cover member 45 is preferably rotatably supported on the tubular member 28 above the nozzle member 43 for cooperation with the upper edge of the mold 14 to prevent the fibrous material from being thrown therefrom.

In forming a plant pot of the type shown in Figs. 1 and 2, a mold having the desired shape, for example, a mold such as 14, is positioned upon the member 17 and the distributing nozzle 31 with its shield assembly are introduced into the mold 14 with the shield or cover member 42 engaging the top of the mold. This introduction of the nozzle and shield member is rendered possible since at this time the shield operating member 40 is at its lowermost position on the member 34, due to the action of gravity which may be assisted by a spring, not shown, with the result that the outer edge of the shield member 36 is permitted to assume its undeflected frusto-conical shape. When, however, the foot portion 41 engages the bottom of the mold, and the nozzle member is lowered to the position shown in Fig. 3, the member 40 deflects the shield member into engagement with the mold adjacent the lower edge of the offset portion 15. The driving means is then placed in operation so that the member 17 and the mold 14 are rotated, whereupon the liquid suspension of fibrous material, which is to be employed in forming the reenforcing band 13, is supplied to the conduit 25 under sufficient pressure to flow from the opening or openings 32 into engagement with the upper portion 15 of the mold 14. Preferably, rotation of the mold is continued after supplying of the fibrous material is terminated, the speed of rotation being such that excess water is thrown off and the fibers are intermeshed with the longer fibers tending to be circumferentially disposed about the inner periphery of offset portion 15 of the mold 14. Sufficient material is supplied during this operation to form a band 13 of a thickness such that the inner surface thereof is either substantially a continuation of the inner surface of the side wall of the mold, below the enlarged portion 15, or extends inwardly somewhat therebeyond.

The apparatus is then elevated sufficiently to permit rocking of the nozzle members so that the member 43 is now aligned with the mold 14, and the apparatus is again lowered until the cover member 45 engages the upper edge of the mold. The mold is then rotated while a slurry of organic fibrous material, for example, a slurry of peat moss, is supplied through the conduit 26 and emerges through the openings 44. When sufficient peat moss or other suspended fibers have been introduced to provide a pot of the desired thickness, the supply of the fibrous suspension is terminated, and at least a part of the excess water in the fibers of the pot being formed is removed by more rapidly spinning the mold, as explained above. As a result of these operations the fibers of the peat moss are circumferentially disposed about the interior of the mold 14 both at the bottom and sides thereof and also extending upwardly to the top of the mold over the inner surface of the band 13. Consequently, the adjacent fibers of the band 13 and of the side wall of the pot interengage or intermesh so as to interlock and form an integral union. Additional water may be removed from the newly formed pot by exerting pressure on the interior thereof, or by other suitable means. After the excess water has been expelled from the material comprising the pot within the mold 14, rotation of the mold is terminated and the nozzle 43 is removed therefrom whereupon the pot 10 is removed, suitably dried and is then ready for use.

A plant pot of somewhat different configuration, but formed in accordance with the principles of this invention, is illustrated in Fig. 4. This form of pot has the side wall 46 thereof of uniform taper from the circular bottom 47 to the upper or rim portion 48 without the said rim portion being thickened or enlarged. This pot, however, is likewise formed from a liquid suspension or slurry of intermeshed organic fibers introduced into a perforate mold while it is rotated so that the longer fibers tend to be distributed in a circular direction extending about the vertical center line of the pot, the upper or rim portion of the side wall being reenforced by a band 49 of spun fibers which may be either organic or inorganic and which are integrally united with the fibers of the side wall 46 in the rim portion 48. As in the preferred embodiment, the fibers comprising the main body of the pot are preferably peat moss, or mixture of peat moss and other fibers, which has been milled or beaten in water so that the fibers are generally individually separated but not broken. The reenforcing band 49 is preferably formed of fibers other than peat moss and which, by way of example, may be stated to preferably comprise kraft paper pulp.

The method of forming the pot shown in Fig. 4 is substantially the same as that employed in constructing the pot shown in Figs. 1 and 2 and may be effected with an apparatus similar to that shown in Fig. 3 by substituting for the mold 14 a similar mold but having a configuration complementary to that of the desired pot. Hence, the steps of the method utilized in forming the pot shown in Fig. 4 need not be separately described. Pots of other configurations, with or without holes in the bottoms, or even entirely without bottoms, may likewise be formed in a similar manner.

When the reenforcing rim 13 is formed of kraft paper fibers greater strength can be provided, especially when the pot is wet, by incorporating one of the substances employed to increase the wet strength of paper products. This may be achieved by adding such a substance to the fibers either while they are being milled or beaten or subsequent thereto so that the said substance treats the individual fibers. By way of example, synthetic resins, such as phenol-formaldehyde, urea-formaldehyde, melamine-formaldehyde, or the like may be so employed in the manner and quantities which will be readily understood by those skilled in the art of paper making. It is also frequently desirable to incorporate an anti-mildew agent in the fibers used for the rim 13 especially where these fibers are derived from kraft paper scraps that may contain sizing or the like. One suitable material for this purpose is zinc dimethyldithiocarbamate in quantities of from 0.1 of 1% to 2% of the dry weight of the fibers depending upon the analysis of the commercially available form of this substance and whether or not a wetting agent is utilized therein.

The main body of the pots may be formed from peat moss fibers exclusively or from mixtures thereof with other cellulose fibers with the peat moss fibers preferably predominating. For example, newsprint pulp fibers, kraft paper fibers or combinations thereof may be employed and may be treated to increase wet strength and/or prevent mildew as explained above for the fibers comprising the reenforcing band. Also minor quantities of other materials may be incorporated in the pots to facilitate growth of the plants, to control acidity and/or to control insects.

It will now be evident that, in accordance with this invention, there is provided an improved plant pot formed principally of organic fibers, which are spun from a liquid suspension in a manner such that the fibers are intermeshed and at least the longer fibers tend to be oriented in a generally circular configuration. Pots thus constructed have satisfactory porosity yet possess strength greatly superior to that of pots which have been pressed from fibers heterogeneously disposed. Moreover, the pots of this invention require no binder in the body thereof in order to retain their shapes and withstand normal commercial handling. Furthermore, the rims of the pots are reenforced so that they are not easily broken during handling even when wet and hence may be handled in the same manner as clay or paper pots. In addition, the reenforcing band cannot be readily detached or loosened from the pot, since it is integrally spun with the material of the pot proper. Furthermore, the novel method of forming the pots facilitates the production thereof in commercially significant quantities thereby enabling the pots to be competitive with other transplanting pots.

While the invention has been disclosed in considerable detail with reference to the preferred embodiment and a modification of the invention, it will be understood that this detailed description and illustration are intended only by way of example and that various modifications and adaptations may be made in the form of the pots and the method of their manufacture without departing from the principles of the invention. Moreover, while the pots are preferably formed principally of peat moss fibers with the reenforcing rim comprising other cellulose fibers, equivalent materials may be employed and various additives utilized as will be evident to those skilled in the art. Consequently, the invention is not to be considered limited except as required by the scope of the appended claims.

Having thus described our invention, we claim:

1. The method of forming a plant pot comprising introducing a liquid suspension of a fibrous material into a perforate mold at only the portion thereof corresponding to the rim of the completed pot while effecting relative rotation between said mold and the means for introducing the suspension, and then introducing a liquid suspension of organic fibrous material into all parts of said mold while again effecting the said relative rotation thereby forming a pot of intermeshed organic fibers with a spun reenforcing band of the first mentioned fibrous material adjacent the top of the pot and integral with the side wall of the pot.

2. The method as defined in claim 1 and wherein the first-mentioned fibrous material consists principally of kraft paper fibers and the said organic material is principally peat moss.

3. The method as defined in claim 1 and further comprising the removal of excess moisture from the pot while it remains in the mold.

4. The method of forming a plant pot comprising introducing a first liquid suspension of a fibrous material into a perforate mold adjacent only the portion thereof corresponding to the rim of the completed pot while effecting rotation of said mold relative to the means for introducing the suspension, terminating introduction of the first liquid suspension after a band of predetermined thickness has been deposited in said mold, then introducing a second liquid suspension of different fibrous material into all parts of said mold while again effecting the said rotation of the mold relative to the means for introducing the suspension, and removing the excess water from the deposited fibers thereby forming a pot of intermeshed fibers with the fibers adjacent the upper edge of the pot being different from but interengaged with those in the main body of the pot.

5. The method as defined in claim 4 wherein the first-mentioned liquid suspension consists principally of kraft paper fibers to which a substance imparting wet-strength to the fibers has been added.

6. The method of forming a plant pot comprising introducing a first liquid suspension of a fibrous material into a perforate mold adjacent only the portion thereof corresponding to the rim of the completed pot, rotating said mold at a speed sufficient to throw off at least a part of the liquid from the deposited fibers, next introducing a second liquid suspension of different fibrous material into all parts of the mold, and then rapidly rotating said mold to throw off at least a part of the liquid from the deposited fibers and thereby provide a pot of intermeshed fibers with the fibers adjacent the upper edge of the pot being different from but interengaged with those in the main body of the pot.

7. The method of forming a plant pot comprising introducing a first liquid suspension of a fibrous material into a perforate mold adjacent only the portion thereof corresponding to the rim of the completed pot while effecting relative rotation between said mold and the means for introducing the suspension, terminating introduction of said liquid suspension after a quantity thereof sufficient to form a band of predetermined thickness has been deposited in the mold, rotating the mold at a speed sufficient to throw off at least a part of the liquid from the deposited fibers, introducing a second liquid suspension of different fibrous material into all parts of said mold while again effecting the said relative rotation between the mold and the means for introducing the suspension, and again rotating said mold at a speed sufficient to throw off at least a part of the liquid from the deposited fibers thereby providing a pot of intermeshed fibers with the fibers adjacent the upper edge of the pot being different from but interengaged with those in the main body of the pot.

References Cited in the file of this patent

UNITED STATES PATENTS

| 1,267,632 | Claussen | May 28, 1918 |
| 1,303,191 | Fulcher | May 6, 1919 |
| 1,328,267 | Cowan | Jan. 20, 1920 |
| 1,956,776 | Simpson | May 1, 1934 |
| 2,067,716 | Landow | Jan. 12, 1937 |
| 2,526,125 | Francis | Oct. 17, 1950 |
| 2,685,969 | Curtis | Aug. 10, 1954 |
| 2,728,169 | Spenger et al. | Dec. 27, 1955 |

FOREIGN PATENTS

| 641,280 | Great Britain | Aug. 9, 1950 |